Dec. 18, 1962  J. G. HOLMSTROM  3,069,185
AIR SPRING FRONT END SUSPENSION
Filed July 14, 1960  5 Sheets-Sheet 1

INVENTOR.
JOHN G. HOLMSTROM
BY
ATTORNEYS

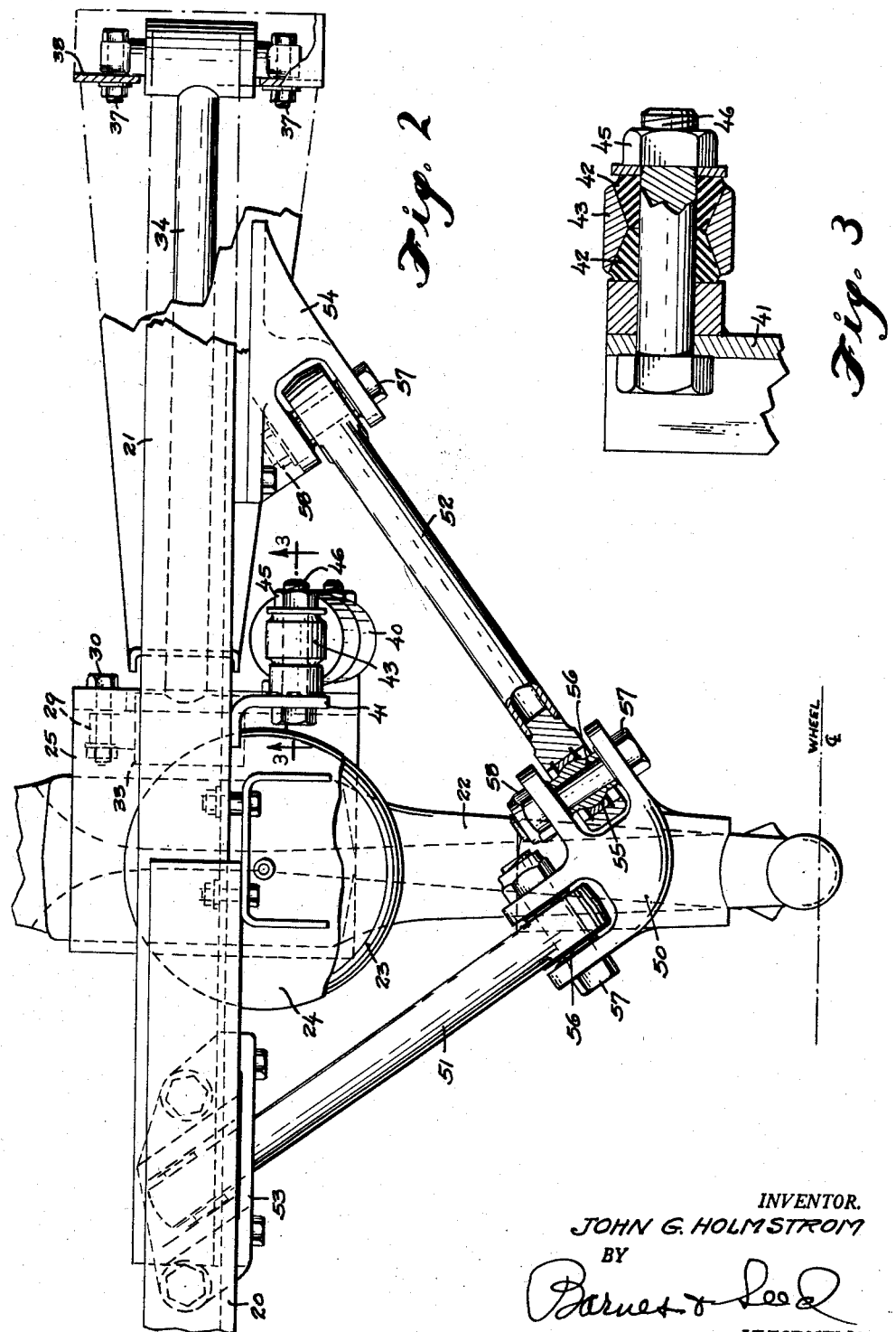

Dec. 18, 1962 J. G. HOLMSTROM 3,069,185
AIR SPRING FRONT END SUSPENSION
Filed July 14, 1960 5 Sheets-Sheet 3

INVENTOR.
JOHN G. HOLMSTROM
BY
ATTORNEYS

Dec. 18, 1962 J. G. HOLMSTROM 3,069,185
AIR SPRING FRONT END SUSPENSION
Filed July 14, 1960 5 Sheets-Sheet 4

INVENTOR.
JOHN G. HOLMSTROM
BY
ATTORNEYS

Dec. 18, 1962  J. G. HOLMSTROM  3,069,185
AIR SPRING FRONT END SUSPENSION
Filed July 14, 1960  5 Sheets-Sheet 5
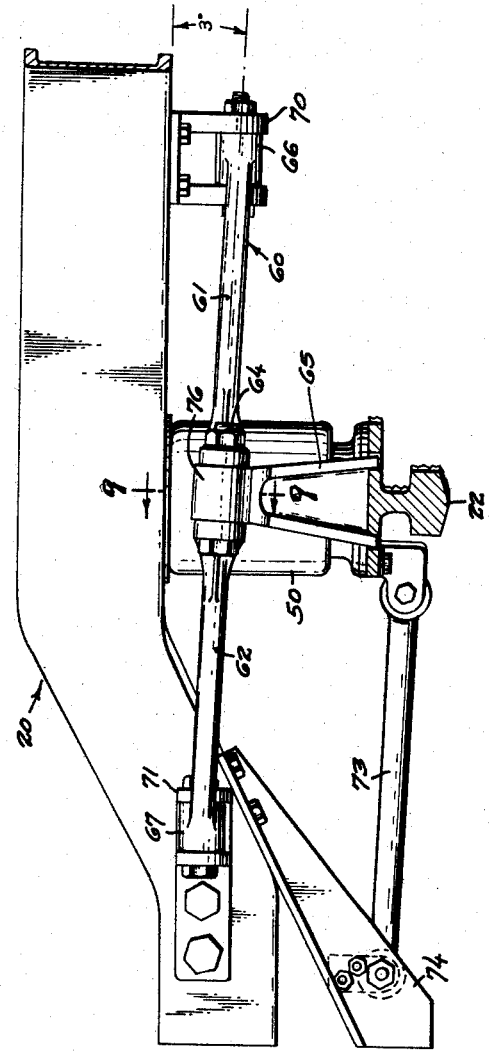
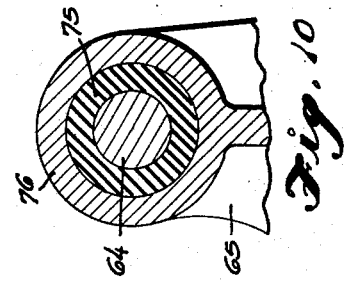
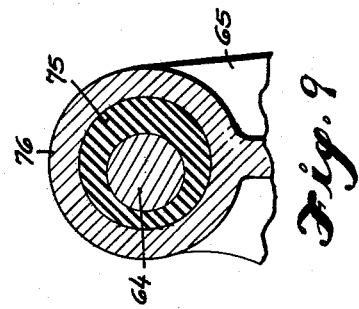
INVENTOR.
JOHN G. HOLMSTROM
BY
ATTORNEYS

United States Patent Office 3,069,185
Patented Dec. 18, 1962

3,069,185
AIR SPRING FRONT END SUSPENSION
John G. Holmstrom, Seattle, Wash., assignor to Pacific Car and Foundry Company, Seattle, Wash., a corporation of Washington
Filed July 14, 1960, Ser. No. 42,898
8 Claims. (Cl. 280—124)

This invention relates to a vehicle suspension employing air springs, and is directed particularly to a front-end suspension.

An important object of the invention is to provide an improved axle suspension having a wish-bone type stabilizer bracing the axle against lateral displacement with the root end attached to the axle and applied so that said root end will swing in an established path about an axis which is generally horizontal and generally longitudinal to the vehicle frame.

As a further important object the invention aims to provide an axle suspension incorporating longitudinal radius rods as complements of the wish-bone stabilizer.

The invention has the further and important object of providing a perfected front end suspension of the air-spring type employing bushings of rubber to compensate the radius rods to relative vertical motion between the two ends of the axle.

These and yet additional more particular objects and advantages in view will appear and be understood in the following description and claims, the invention consisting in the novel construction and in the adaptation and combination of parts hereinafter described and claimed.

In the accompanying drawings:

FIG. 2 is a fragmentary top plan view thereof.

FIG. 3 is a fragmentary longitudinal vertical sectional view drawn to an enlarged scale on line 3—3 of FIG. 2.

FIG. 8 is a longitudinal vertical sectional view thereof with the scale enlarged.

FIG. 9 is an enlarged-scale transverse vertical sectional view drawn to an enlarged scale on line 9—9 of FIG. 8; and FIG. 10 is a view similar to FIG. 9 illustrating the parts as they appear when the spring suspension traverses a road irregularity causing either a jounce or rebound.

Figure 1:
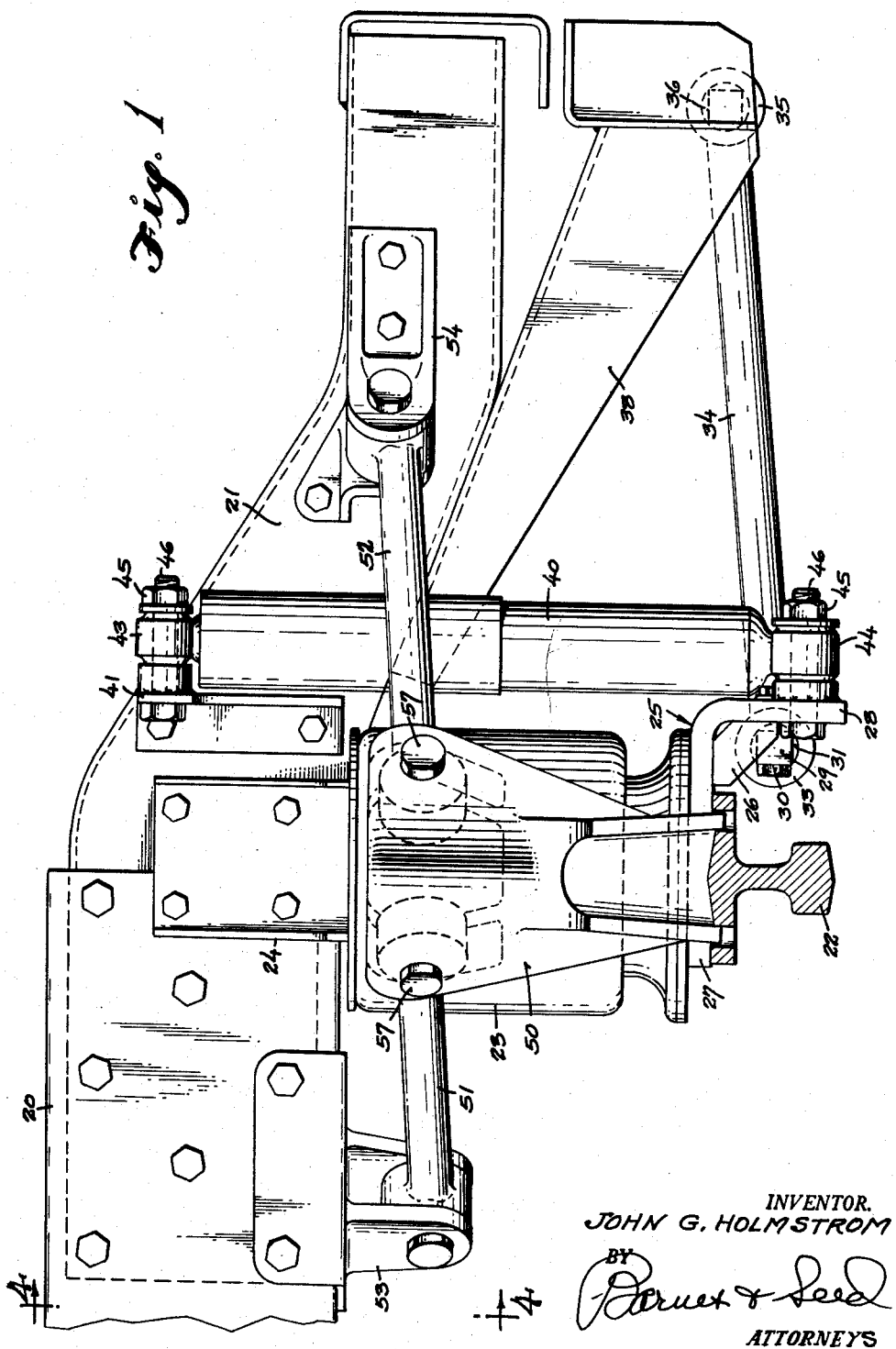
FIGURE 1 is a fragmentary longitudinal vertical sectional view portraying the front end of a vehicle embodying an air-spring suspension system constructed according to one embodiment of the present invention, the section line being shown at 1—1 in FIG. 4.
Figure 4:
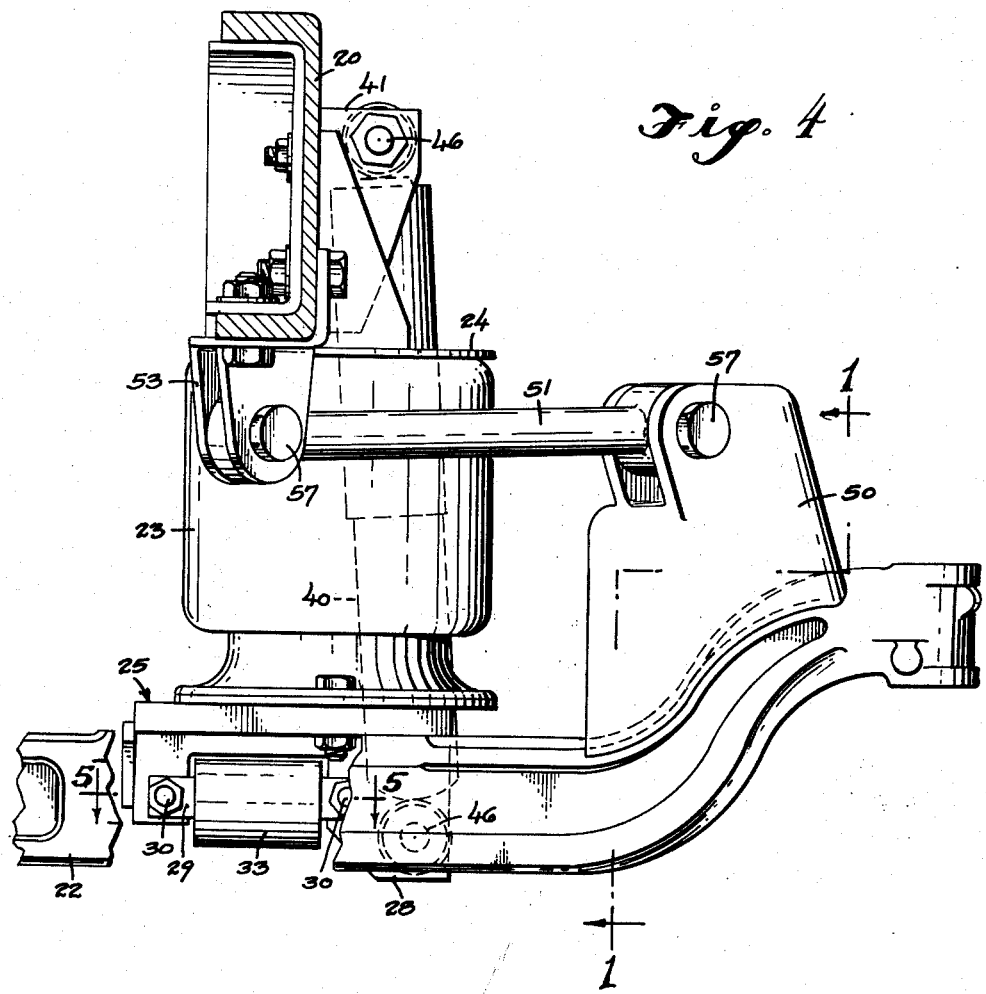
FIG. 4 is a fragmentary transverse vertical sectional view on line 4—4 of FIG. 1.
Figure 5:
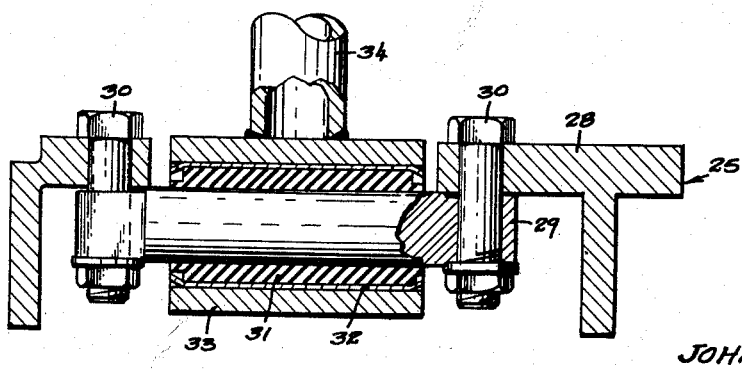
FIG. 5 is a fragmentary horizontal sectional view drawn to an enlarged scale on line 5—5 of FIG. 4.

Referring to said drawings, and first describing the preferred embodiment of FIGS. 1 through 5, inclusive, there is shown the front-end portion of a vehicle frame including the usual longitudinal frame channels. Where, as in the illustrated vehicle, the front end of said longitudinal principals curves downwardly to the front of the axle, the usual practice is to form such curved prolongation separately from the main channel member, securing the same by bolts to the frame proper. The frame proper is designated by 20 and the prolongation by 21. The vehicle's front axle is designated by 22. Between each frame principal and the underlying related end of the axle there is received a respective air spring 23. The structural details of these air springs are unimportant and suffice it to say that an upper component is attached by a bracket 24 to the frame principal while a lower component is attached by a bracket 25 to the axle.

Each of the two brackets 25 is an angular member reinforced by gussets 26 and has one of its legs 27 overlying the axle as a horizontal seat for the related air spring while the other leg 28 depends vertically therefrom in a position spaced somewhat to the front of the axle. Leg 28 has a yoke-like construction when viewed from the front. A trunnion pin 29 traverses the interstice which lies between the yoke-arms and is secured by bolts 30 to said yoke-arms. The median portion of the pin has a bushing 31 of rubber vulcanized thereon. The bushing is held under compression by a containing sleeve 32 which is in turn press-fitted in an eye 33 which is welded or otherwise made integral with the after end of a radius rod 34. As can be seen from an inspection of the drawings, the radius rod normally occupies an approximate horizontal plane and parallels the longitudinal median line of the vehicle. The front end has a corresponding eye 35 thereon which similarly grips a trunnion pin 36 by means of a compressed rubber bushing, this latter pin being secured by bolts 37 to a respective bracket 38 which is rigidly secured to the related frame principal.

For each of the two ends of the axle a respective shock absorber 40 extends vertically from the bracket 25 below to a frame-carried bracket 41 above. The connections in each case comprise split rubber conical bushings 42 compressed within mating sockets of terminal eyes, as 43 and 44, by nuts 45 working on anchor pins 46.

One end of the axle, at a point thereon outwardly spaced beyond the related air spring, is rigidly surmounted by a perch 50. From this perch two identical brace rods 51 and 52 extend diagonally inwardly one to a bracket 53 hung from the proximal frame principal 20 at a point spaced well to the rear of the air spring and the other to a bracket 54 secured to the outer face of said prolongation 21 at a point spaced well to the front of the air spring. The attachment for each of the two ends of each rod comprises a ball-and-socket joint. The socket is formed in a ring 55 fitted in an eyed end of the rod. The ball is formed upon a bearing 56 clamped by a bolt-and-nut combination 57—58 in a fork of the perch or the concerned bracket, as the case may be.

The axial line of the bolts 57 by which said bearings 56 are carried are disposed horizontally in planes normal to the vertical planes in which the related stabilizing brace rod normally lies.

It will be apparent that the brace rods, in the nature of a loose-jointed wishbone, perform the function of a stabilizer and, together with the radius rods below, transmit forces from the axle to the frame. In the embodiment above described the resistance to torsional twist provided by the stiffness of the axle effectively stabilizes the assembly with only a single set of the brace rods.

Figure 6:
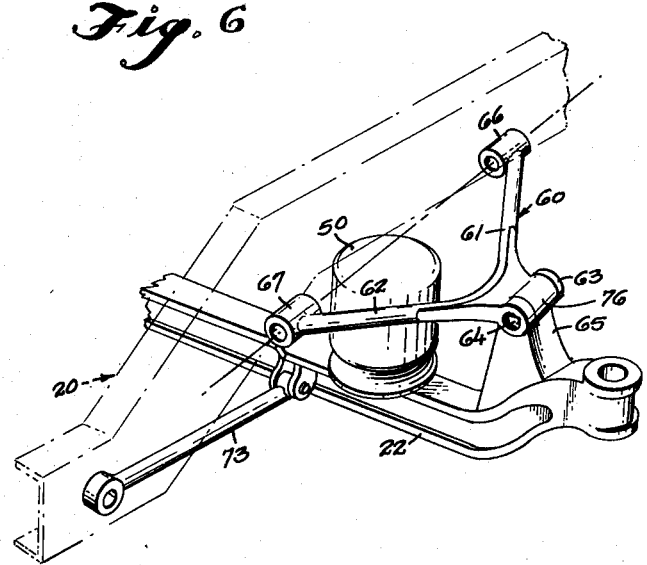
FIG. 6 is a fragmentary perspective view illustrating a second embodiment of the invention and with the frame of the vehicle shown in phantom.
Figure 7:
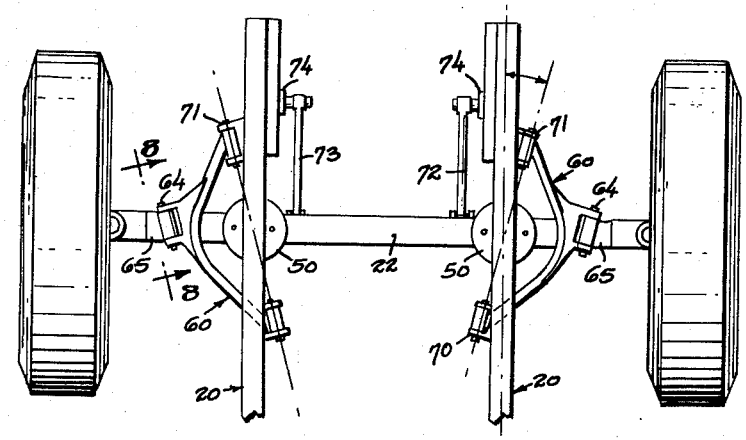
FIG. 7 is a reduced-scale fragmentary top plan view of said second embodiment.

In the embodiment illustrated in FIGS. 6 through 10, inclusive, I have illustrated an arrangement in which a wishbone stabilizer 60 is applied to each of the two sides of the vehicle. The median point of union in this instance is rigid so that the two arms 61 and 62 become integral with one another. Upon such root end there is provided an outwardly directed fork 63 having the two fork-arms co-axially bored to accommodate a fulcrum pin 64 carried by a counterpart 65 of the perch 50, and upon the free ends of the stabilizer arms there are provided co-axial eyes 66 and 67 each of which is received in a forked bracket, as 70 and 71, bolted or otherwise rigidly secured to the vehicle frame. Counterparts 72 and 73 of the radius rods 34 extend forwardly parallel to the longitudinal median line of the vehicle from the axle 22 to a frame-carried bracket 74.

Compressed rubber bushings are provided for the two eyes 66 and 67, the two ends of each radius rod 72 and 73, and the perch 65. As can be best seen from an inspection of FIGS. 9 and 10, the bushing 75 is molded so as to provide an appreciably thicker wall upon the inboard than upon the outboard side, thus normally placing the fulcrum pin 64 eccentric to the eye 76 of the perch and favoring the outboard side. As the frame moves relative to the axle between jounce and rebound limits the resulting foreshortening of the arms of the wishbone stabilizers, as the same pivot about the centers of the terminal eyes 66 and 67 as an axis, draws the fulcrum pins 64 inwardly toward the concentric position shown in FIG. 10 or, under extreme loading, beyond such point. The complete radial motion required due to said foreshortening during travel of the axle from jounce to rebound may be taken entirely in the perch bushing, this being preferred, or divided between said perch bushing and the rubber bushings of the terminal eyes. An approximate 17° motion occurs in both directions from center as the bushings for the terminal eyes are torsionally rotated under the stress which reflects movement between jounce and rebound limits.

It will be noted that the frame axis about which the wishbone stabilizers 60 rock lies in such diagonal relation to the vehicle's longitudinal median line as will permit the axle to shift in a fore-and-aft direction dictated by its swing about the pivot center of the radius rods 72 and 73. A similar end is accomplished in my first-described embodiment wherein it will be seen that a longitudinal vertical plane traversing the two centers about which the loose-jointed wish-bone pivots lies in much the same diagonal relationship to the vehicle's longitudinal median line, approximately 15°, as the pivot centers of the eyes 66 and 67.

It is believed that the invention will have been clearly understood from the foregoing detailed description of my now-preferred illustrated embodiment. No limitations are implied and it is my intention that the hereto annexed claims be given the broadest interpretation to which the employed language admits.

What I claim is:

1. In a vehicle suspension, in combination: a vehicle frame, an axle, spring means between said frame and axle, a respective longitudinally disposed radius rod for each of the two ends of the axle pivotally connected at one end with the axle and at the other end with the frame, and a respective wishbone-type stabilizer for each of the two sides of the vehicle, each of said stabilizers having a root pivot attachment with the axle at a point laterally removed to the outside of the frame and a free-end pivot attachment with the frame, said stabilizer pivot axes being so disposed as to constrain vertical deflection of the axle at its said point of attachment with the stabilizer to arcuate motion about an approximate horizontal axis generally longitudinal to the frame, the pivot attachment for the root end of each of said stabilizers comprising a respective bushing of rubber secured between a mounting pin and an eye, said pins and eyes being provided one by the axle and the other by the root end of the concerned stabilizer.

2. In a vehicle suspension, in combination: a vehicle frame, an axle, spring means between said frame and axle, a respective longitudinally disposed radius rod for each of the two ends of the axle pivotally connected at one end with the axle and at the other end with the frame, and a connection between the axle and the frame providing lateral stability therefor comprising two brace rods converging toward one another in a generally horizontal plane with the spread ends both pivotally attached to the frame, one to the front and the other to the rear of the transverse vertical plane of the axle and with the closed ends both pivotally attached to the axle, the axes of said pivots for the brace rods being approximately horizontal and generally longitudinal to the frame, the attachment for the two ends of both brace rods each comprising a ball-and-socket joint giving limited universal movement.

3. A suspension according to claim 1 in which said rubber bushings are so formed as to normally locate the axial center of the concerned mounting pin in such a position laterally offset from the axial center of the related eye as will compensate the bushing to foreshortening of the lateral reach of the stabilizers during travel of the axles between jounce and rebound limits.

4. In a vehicle suspension, in combination: a vehicle frame, an axle, spring means between the frame and the axle, longitudinally extending radius rods for each end of said axle pivotally connected with the axle and with the frame, a perch on at least one end of the axle rigidly surmounting the same at a position laterally removed from the frame, and an attachment between the perch and the frame comprising two braces which diverge toward the frame so as to produce a wishbone-type stabilizer, the attachment of said stabilizing braces to both the perch and the frame being in each instance a pivot connection with the concerned axis disposed in an approximate horizontal plane which is generally longitudinal to the frame.

5. In a vehicle suspension, in combination: a vehicle frame, an axle, means without lateral stability resiliently mounting said frame upon the axle, longitudinally extending and generally horizontal radius rods for each end of said axle pivotally connected with the axle and with the frame, and a generally horizontal wishbone-type stabilizer having a root pivot attachment with a perch surmounting one end of the axle and a free-end pivot attachment with the frame which is laterally removed from the perch, said stabilizer having its pivot axes so disposed as to constrain vertical deflection of said root attachment to arcuate motion about an approximate horizontal axis generally longitudinal to the frame.

6. In a vehicle suspension, in combination: a vehicle frame, an axle, a perch surmounting said axle upon one end thereof at a point laterally removed to the outside of the frame, means without lateral stability resiliently mounting said frame upon the axle, longitudinally extending and generally horizontal radius rods for each end of said axle pivotally connected with the axle and with the frame, and a generally horizontal wishbone-type stabilizer having a root pivot attachment with said perch and a free-end pivot attachment with the frame, said stabilizer having its pivot axes so disposed as to constrain vertical deflection of said root attachment to arcuate motion about an approximate horizontal axis generally longitudinal to the frame.

7. Structure according to claim 6 in which one of the two arms of said wishbone-type stabilizer angles forwardly and the other rearwardly from the perch.

8. In a vehicle suspension including an axle and a frame, in combination: an air spring at each end of the axle resiliently mounting said frame upon the axle, at least two sets of transverse horizontal mounting pins one at one side and the other at the other side of the vehicle with one pin of each set secured to the axle and the other pin secured to the frame in positions spaced apart longitudinally of the vehicle, a respective rod connecting each set of said pins having eyed ends engaging the pins, another set of horizontal mounting pins for at least one side of the vehicle comprising two pins secured to the frame, one spaced to the front and the other to the rear of the vertical plane occupied by the axle and at least one pin secured to the axle at a point laterally removed from the frame-carried pins, and a wishbone-type stabilizer connecting the last-named set of mounting pins having terminal eyes both upon the spread ends and upon the closed ends, the former engaging the frame-carried pins and the latter engaging the axle-carried pin, the stabilizer's two frame-carried mounting pins occupying a longitudinal vertical plane diagonal to but closely approaching a condition of parallelism with the longitudinal median line of the frame prescribing a vertical travel path for the stabilizer's axle-carried mounting pin corresponding to the arcuate path prescribed by the radius rods, the mounting pin for the closed ends of the stabilizer being carried by a perch surmounting the axle and normally locating the pin at approximately the same level as that occupied by the mounting pins for the spread end of the stabilizer.

References Cited in the file of this patent

UNITED STATES PATENTS

| | | |
|---|---|---|
| 2,179,016 | Leighton | Nov. 7, 1939 |
| 2,184,933 | Brown | Dec. 26, 1939 |
| 2,258,663 | Travilla | Oct. 14, 1941 |
| 2,290,183 | Hickman | July 21, 1942 |
| 2,345,201 | Krotz | Mar. 28, 1944 |
| 2,869,891 | Venditty et al. | Jan. 20, 1959 |
| 2,888,271 | Butterfield | May 26, 1959 |
| 2,967,063 | Mueller et al. | Jan. 3, 1961 |
| 2,994,396 | Bidwell | Aug. 1, 1961 |